Jan. 22, 1952  J. C. MOUZON  2,583,339
SERVOMOTOR DAMPING SYSTEM
Filed Aug. 17, 1950  2 SHEETS—SHEET 1

*INVENTOR.*
JAMES C. MOUZON
BY Arthur H. Swanson
ATTORNEY.

Jan. 22, 1952     J. C. MOUZON     2,583,339
SERVOMOTOR DAMPING SYSTEM
Filed Aug. 17, 1950     2 SHEETS—SHEET 2

AVERAGE PLATE CHARACTERISTICS FOR TRIODES U AND W

INVENTOR.
JAMES C. MOUZON
BY
ATTORNEY.

Patented Jan. 22, 1952

2,583,339

UNITED STATES PATENT OFFICE 2,583,339

SERVOMOTOR DAMPING SYSTEM

James C. Mouzon, Chevy Chase, Md., assignor to Minneapolis-Honeywell Regulator Company, Minneapolis, Minn., a corporation of Delaware Application August 17, 1950, Serial No. 179,928

7 Claims. (Cl. 318—28)

A general object of the present invention is to provide improved damping mechanism for measuring and control apparatus. The invention was devised primarily for use in damping the rebalancing movements of the reversible rebalancing electric motor of a self-balancing measuring and control apparatus of the general type of the well known and widely used potentiometric measuring and control apparatus disclosed and claimed in the Wills Patent 2,423,540 of July 8, 1947.

A primary object of the present invention is to provide novel means, characterized by its simplicity and effectiveness, for developing a degenerative damping singal which can be fed back into the input circuit of the electronic drive unit controlling the energization of the rebalancing motor of measuring and control apparatus of the character disclosed in the above mentioned Wills patent.

However, my novel damping mechanism is not restricted to use in apparatus of the type disclosed in the Wills patent, but can be used in any form of measuring and control apparatus including a reversible mechanism adapted for operation in response to a signal appearing in the output circuit of an alternating current amplifier, and adapted to effect an adjustment of a damping mechanism element and thereby effect a damping action while said reversible mechanism is being actuated by said amplifier.

A more specific but practically important object of the presence invention is to provide a damping unit which is adapted for use with measuring or control apparatus including a device which operates in a direction and during a period depending on the character of a change in a condition being measured or controlled, and is operative to produce a damping effect while and only while said device is in operation. The damping unit of the present invention is characterized by the inclusion of a pair of triode electronic valves, and means for causing said valves to have different operating points on the same dynamic transfer characteristic while said device is in operation, thereby to produce a damping signal of a polarity depending on the direction of operation of said device, and for causing said valves to have the same operating point on said characteristic and to produce no damping signal when said device is not in operation.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Figure 1:
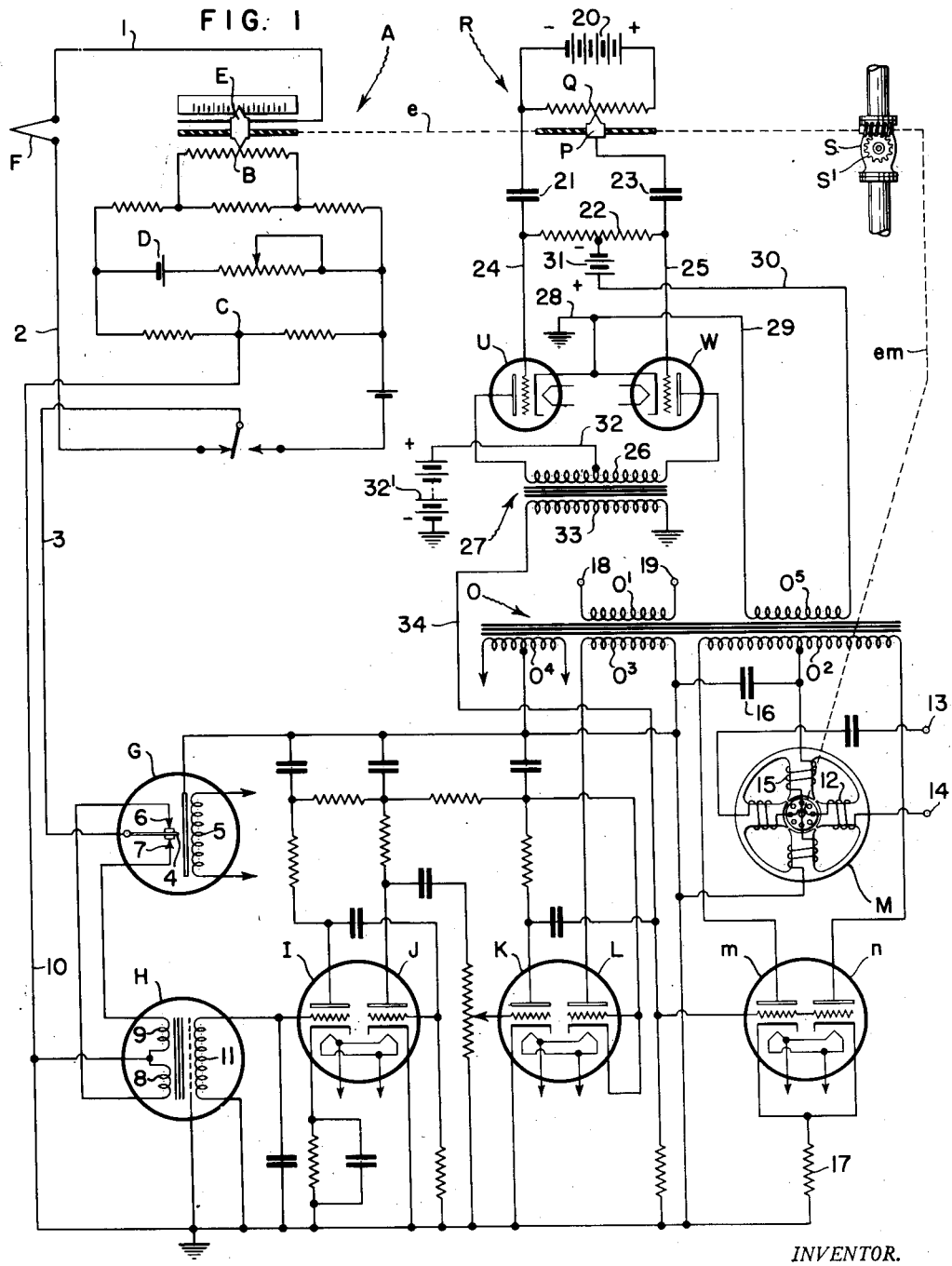
Fig. 1 is a circuit diagram illustrating a preferred embodiment of the invention.

In Fig. 1, I have illustrated, by way of example, a preferred form of embodiment of the present invention in a self-balancing apparatus for measuring the temperature of a thermocouple F and for producing a rebalancing movement of a rebalancing motor M on a change in the thermocouple temperature to thereby rebalance the measuring apparatus. The disclosed apparatus is also operative to produce a control adjustment of a magnitude and in a direction determined by the magnitude and direction of the thermocouple voltage change. The apparatus shown in Fig. 1 includes a conventional split potentiometer measuring circuit A of conventional form. The circuit A comprises one branch including a slidewire resistor B, and a second branch including a terminal point C between a pair of resistors connected in series with one another between the terminals of the circuit branch including the slidewire B. Each of said branches is connected in parallel with the other and in series with a circuit energizing branch including a battery D or other source of unidirectional energizing current. A slider contact E engages the slidewire B and is adjustable along the length of the latter by the rotation of an adjusting element e.

The thermocouple F has a terminal 1 in continuous engagement with the slider contact E, and has a second terminal 2 normally connected through a calibrating switch and a conductor 3 to the polarized vibrating element or reed 4 of a vibrator mechanism G including a winding 5 energized by alternating current to cause the vibrating element or polarized reed 4 to vibrate with the frequency of the alternating current impressed on the winding 5. As the reed 4 vibrates back and forth under the action of the coil 5, it alternately engages contacts 6 and 7. The contact 6 is connected to one end terminal of a winding 8 forming a portion of the primary winding of a transformer H. The later has a second primary winding portion connected to the contact 7. The windings 8 and 9 are shown as arranged end to end with their adjacent ends connected by a conductor 10 to the previously mentioned point C including in the second branch of the split potentiometer circuit A.

As is fully explained in the aforementioned Wills patent, when the measuring apparatus is unbalanced by a change in the thermocouple voltage, current is caused to flow in the circuit comprising the thermocouple F, its terminals 1 and 2, conductor 3, vibrator reed 4, contacts 6 and 7, transformer windings 8 and 9, and conductor 10 and the bridge circuit connection between the slider contact E and the fixed bridge circuit point C. Current flow through the thermocouple between the slider E and bridge point C occurs when the voltage of the thermocouple F is not equal and opposite to the voltage drop in the bridge circuit A between the bridge point C and the point on the slidewire resistor B engaged by the contact E. When such unbalance occurs, the rebalancing motor M is set into operation and adjusts the slider contact E in the direction and to the extent necessary to restore equality between the voltage of the thermocouple and the potential drop in the bridge circuit between the point C and the slidewire point engaged by the slider contact E. When the apparatus is unbalanced, the direction of current flow through the thermocouple is in one direction or the other accordingly as the thermocouple voltage exceeds or is less than the voltage drop in the bridge circuit between the point C and the slider contact E.

When current flows through the thermocouple circuit, the operation of the vibrator G causes current pulses to flow alternately through the transformer primary windings 8 and 9. When the voltage unbalance is in one direction, the current pulses flow through each of the windings 8 and 9 toward the center tap terminal conductor 10. When the unbalance is in the opposite direction, the current flow through each of the windings 8 and 9 is in the direction away from the end of the winding connected to the conductor 10. When the alternately flowing currents in the windings 8 and 9 are toward their ends connected to the conductor 10, an alternating current is induced in the transformer secondary winding 11 which is in phase with or 180° out of phase with the current flow in the energizing coil 5 of the vibrator G, depending on the construction of the apparatus. The phase of the current induced in the winding 11 is reversed, or shifted 180°, by a reversal in the direction of the currents flowing through the transformer windings 8 and 9.

The voltage of one phase or the opposite phase induced in the transformer secondary winding 11 is amplified in a voltage amplifier comprising first, second, and third stage electronic amplifying valves I, J, and K, shown as triodes and supplied with undirectional anode current by a fourth valve L, shown as a triode connected to operate as a rectifying diode. The output circuit of the third stage valve K is connected to the control grids of electronic valves $m$ and $n$. The latter are shown as triodes having their anodes connected to the opposite ends of the secondary winding $O^2$ of a power transformer O having a primary winding $O'$. As shown, the transformer O also comprises a secondary winding $O^3$ supplying the current rectified by the valve L, and a secondary winding $O^4$ supplying current to the coil 5 of the vibrator element G and to the cathode heating elements of the valves I, J, K, L, $m$, and $n$. The transformer O also includes a secondary winding $O^5$ serving a purpose hereinafter specified.

The motor M includes a power winding 12 connected in series with a condenser between energizing terminals 13 and 14 arranged for connection to a source of alternating current of suitable frequency and voltage, for example, 60 cycles per second and 115 volts, respectively. The motor M also includes a control winding 15 connected in parallel with a condenser 16 between a center tap connection to the secondary winding $O^2$ and the connected cathodes of the motor drive valves $m$ and $n$ through their common cathode resistor 17. The transformer primary winding $O'$ has terminals 18 and 19 arranged for connection to the source of alternating current to which the terminals 13 and 14 of the motor power winding 12 are connected.

When the measuring circuit is unbalanced, the signal impressed on the control grids of the valves $m$ and $n$ by the output circuit of the valve K starts the motor M into rotation in the direction to adjust the slider contact E as required to rebalance the measuring apparatus and thereby interrupt the rotation of the motor M. As diagrammatically shown, the slidewire E is adjusted by the rotation of a threaded portion of the adjusting shaft or element $e$, and the latter is rotated in a direction depending upon the rotation of the motor M through a mechanical connecting element $em$.

The above described apparatus, through which a change in the temperature of the thermocouple F sets the motor M into rotation to adjust the slider contact E in the direction and to the extent required to rebalance the measuring apparatus, is not only fully disclosed in the prior Wills patent, but is and long has been in general use in this country, and requires no further description herein.

In accordance with the present invention, each adjustment movement given to the element $e$ by the motor M not only adjusts the slider contact E along the slidewire resistor B included in the potentiometric measuring circuit A, but also effects two additional control actions. One of those actions is an adjustment of a slider contact P along a slidewire resistor Q constituting one element of a damping unit R. The second additional control action is the adjustment of a regulator S, shown as a fuel valve adjusted by the rotation of the shaft $e$ through a worm carried by that shaft and a gear $S'$ carried by the stem of the valve S. The fuel valve S may control the temperature of the thermocouple F by supplying fuel to a furnace or heater to the temperature of which the thermocouple F is responsive. The terminals of the slidewire resistor Q are connected across a source of unidirectional voltage, shown as a battery 20. One terminal of the resistor Q is connected through a condenser 21 to one terminal of a resistor 22. The other terminal of the resistor 22 is connected through a condenser 23 to the slider contact P. The resistor Q together with its associated condensers 21 and 23 serve to apply a voltage in one direction or the other across the resistor 22 as the slider contact P is adjusted to the right or left along the resistor Q. The magnitude of that voltage varies in accordance with the rate of motion of the slider contact P.

One end of the resistor 22 is connected by a conductor 24 to the control grid of an electronic valve U, and the other end of the resistor 22 is connected by a conductor 25 to the control grid of an electronic valve W. As shown, the valves U and W are triodes having their anodes or plates connected across the primary winding 26 of a transformer 27. The cathodes of the triodes U and W are connected to one another, and have a common ground connection 28. The cathodes of the two triodes are also connected to the midpoint of the resistor 22 through the secondary winding $O^5$ of the transformer O, its terminals 29 and 30, and a biasing source of unidirectional voltage 31, the negative terminal of said voltage source being connected to the resistor 22. The center tap connection 32 of the transformer primary winding 26 is maintained at a fixed positive potential relative to the cathodes of the valves U and W by means of a source of unidirectional voltage 32' through which the center tap 32 is connected to ground.

As those skilled in the art will understand without further explanation, a change in the temperature to which the thermocouple F is exposed and a resultant change in the thermocouple voltage unbalance the bridge circuit A and thereby create a unidirectional current flow through the circuit including conductor 3, the vibrating contacts of the vibrator G, the primary windings 8 and 9 of the transformer H, and the conductor 1. The pulsating current flow through the windings 8 and 9 induces an alternating current signal in the secondary winding 11 and thereby impresses a control signal on the input circuit of the valve I. That signal is successively amplified by the valves I, J, and K, and the amplified signal is transmitted from the output circuit of the valve K to the connected control grids of the motor drive valves m and n.

The phase of the signal developed in the transformer winding 11 depends upon the direction of the flow of the unidirectional current through the circuit including the conductors 3 and 10. The frequency of alternation of that signal is the frequency of the source of alternating current to which the terminals of the primary winding O' and the terminals of the power winding 12 of the motor M are connected. In consequence, the signal developed in the winding 11 causes the motor M to operate in the direction and to the extent required to move the slider contact E into the position along the slidewire B at which the potential between the contact E and the bridge point C is equal and opposite to the voltage of the thermocouple F. The operation just described is the normal operation of the apparatus disclosed in said Wills patent.

The triodes U and W are in a balanced circuit when the contact P is stationary, and no alternating signal is then induced in the secondary winding 33 of the transformer 27. When the contact P is in motion, however, the damping unit input circuit is unbalanced and the grid of the valve W then goes positive or negative relative to the grid of the valve U, depending upon the direction of motion of the contact P. This results in the development of an alternating current in the transformer secondary winding 33. That current is in synchronism with the output current of the amplifier valve K, and is opposite in phase to that output current. The current thus induced in the transformer secondary winding 33 constitutes a damping signal which is fed through the conductor 34 to the input circuit of the valves m and n. The connections to the ends of the secondary winding 33 are so arranged that the signal impressed through the conductor 34 on the grids of the valves m and n is always opposite in phase to the signal impressed on those grids by the amplifier valve K. The signal transmitted through the conductor 34 is thus a degenerative damping signal, which increases in effectiveness, as balance is closely approached, because of the consequent reduction in magnitude of the opposing driving signal impressed on the control grids of the motor drive valves m and n from the valve K.

Figure 2:
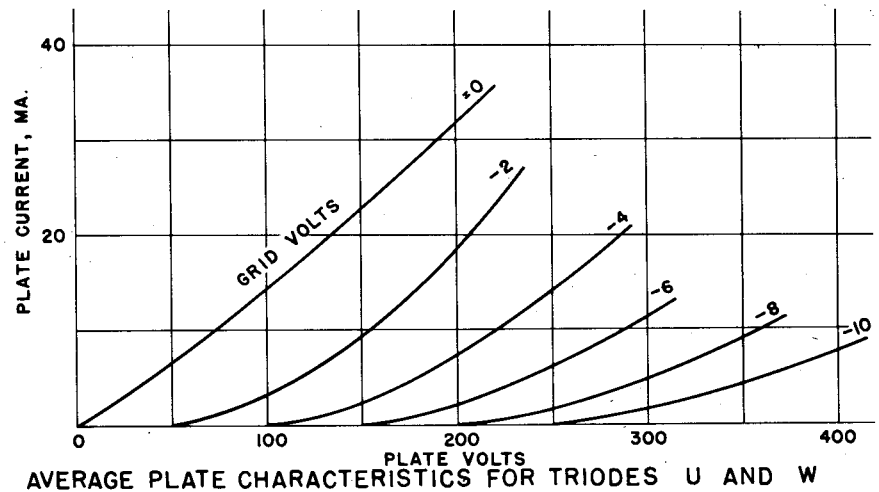
Fig. 2, is a graph illustrating typical average plate characteristics for the triode valves employed in the damping mechanism of the arrangement of Fig. 1.

The triodes U and W are assumed to be similar to one another, and to have the average plate characteristics shown by the family of curves in Fig. 2. For the purposes of the present invention, the constants of the circuits including the triodes U and W are given such values that the variations in the unidirectional signal voltages impressed on the grids of the valves U and W, when the contact P is in motion along the resistor Q, will cause those triodes to have different operating points on the curved or non-linear portion of the dynamic transfer characteristic curve 50 shown in Fig. 3. The curve 50 is derived from the family of curves of Fig. 2 by plotting plate current against the intersections of the grid voltage curves with the ordinate corresponding to a plate voltage of 200 volts, which is assumed to be the plate voltage of each of the tubes U and W. When the contact P is stationary, the valves U and W have the same operating point on the curve 50 and no alternating current is then induced in the secondary winding 33 of the transformer 27. The non-parallelism of the various grid voltage curves of Fig. 2 causes the lower portion of the curve 50 of Fig. 3 to be curved or non-linear.

Figure 3:
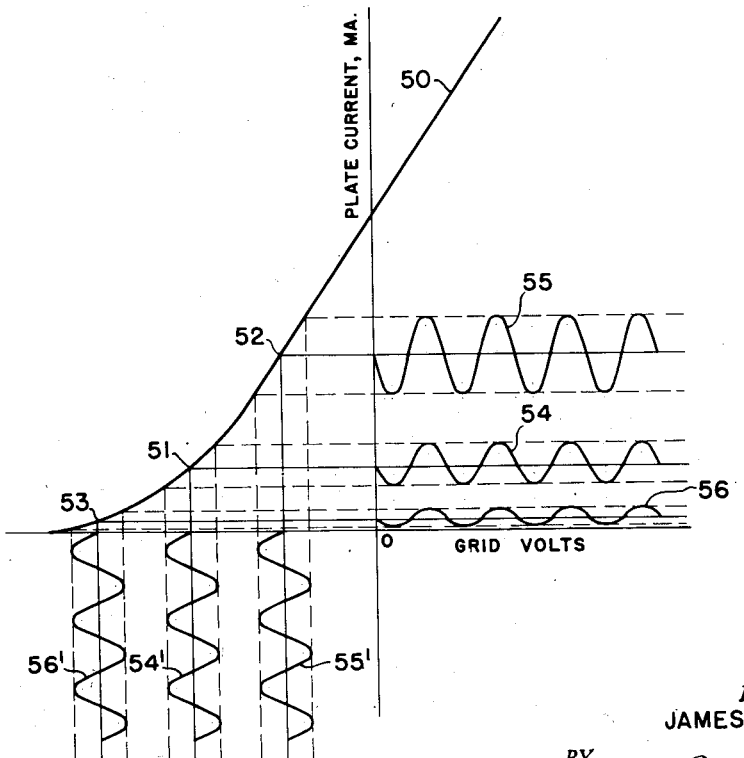
Fig. 3. is a graph illustrating a typical dynamic transfer characteristic for the same triode valves.

In Fig. 3, the numeral 51 designates the common transfer characteristic operating point on the curve 50 for each of the triodes U and W, and the curve 54 represents the alternating component of plate current of each triode when no input signal is impressed on the control grids of the triodes from the slider contact P and condensers 21 and 23, and the plate current swings of the two triodes are alike. Under that condition, no damping mechanism output signal is produced. In Fig. 3, the operating points 51, 52, and 53 correspond to grid voltages of —4, —2, and —6 volts, respectively. The negative 4 volt bias is due to the voltage source 31; i. e., the voltage of —4 volts represents the bias voltage of each triode when the slider contact P is stationary and impresses no input signal on the grids of the triodes U and W. When the movement of the slider contact P along the resistor Q is in the direction and at the rate required to reduce the negative bias voltage on the control grid of the valve U to 2 volts and to increase the negative bias voltage on the control grid of the valve W to 6 volts, the operation point of the valve U will be the point 52 on the curve 50, and the operation point of the valve W will be the point 53 of the curve 50.

In Fig. 3, the curve 54 represents the alternating component of plate current of each of the triodes U and W when both triodes have the common operation point 51, and the curves 55 and 56 represent the alternating components of plate current of the valves U and W, respectively, when the triode U has the operation point 52, and the triode W has the operation point 53. The curve 54' represents the common grid voltage of the two valves when they have the common operating point 51. The curve 55' represents the grid voltage for the valve U, and the curve 56' represents the grid voltage for the valve W, when the input voltage due to the movement of the contact P makes the bias voltage for the valve U less negative and makes the bias voltage of the valve W more negative. As will be understood, if the direction of movement of the contact P were reversed, but not altered in magnitude, the curves 55 and 55' would illustrate the operation of the valve W and the curves 56 and 56' would illustrate the operation of the valve U.

As Fig. 3 indicates, the alternating component of plate current represented by the curve 55 is of substantially greater magnitude than the alternating current component represented by the current curve 56. In consequence of the inequality in magnitude of the two alternating plate current components flowing in the two halves of the transformer winding 26 when the contact P is in motion, an alternating current damping signal is then developed in the secondary winding 33 of the transformer 27. With the proper circuit connections, that damping signal will be opposite in phase to the control or driving signal impressed on the control grids of the valves $m$ and $n$ by the output circuit of the final stage valve K of the electronic amplifier. The damping unit R is simple and effective, particularly since it has the desirable inherent capacity of increasing the magnitude of the damping signal, relative to the motor drive signal impressed on the control grids of the motor drive valves $m$ and $n$, as the balanced condition of the apparatus is closely approached. That increase results from the fact that the magnitude of the damping signal is dependent on the speed of the rebalancing motor M. As balance is closely approached, the motor drive signal transmitted to the control grids of the valves $m$ and $n$ diminishes without producing a corresponding immediate decrease in the speed of the motor M, due to the inertia of the latter and of the mechanism which it adjusts. In consequence, the damping signal amplitude sharply increases relative to that of the driving signal, whereby the damping effect rapidly increases at the very instant at which the increased damping effect is most needed.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. An electrical unit comprising in combination, a resistor, a source of variable unidirectional voltage and means cooperating therewith to maintain the two ends of said resistor at the same potential when said variable voltage is constant, and for increasing or decreasing the potential of one end of said resistor relative to the other end when said variable voltage is varying in one direction or in the opposite direction, respectively, a pair of electronic valves each having a control grid, a cathode, and an anode, one of said control grids being connected to one end and the other of said control grids being connected to the second end of said resistor, a transformer having primary and secondary windings and having said primary winding connected between the anodes of said valves, means including a source of unidirectional voltage connecting the midpoint of said transformer primary winding to said cathodes and arranged to keep the potentials of said anodes positive relative to the potentials of said cathodes, and means for connecting a source of unidirectional bias voltage and a source of alternating bias voltage in series between an intermediate point of said resistor and said cathodes, said biasing voltages being proportioned and arranged for operation of said valves along a curved, non-linear portion of the dynamic transfer characteristic curve of said valves.

2. An electrical unit as specified in claim 1, in which the source of variable unidirectional voltage includes a potentiometer resistance having a slider contact engaging said potentiometer resistance and adjustable along the latter.

3. An electrical unit as specified in claim 2, in which the first mentioned means comprises a condenser connecting one end of said resistor to one end of said potentiometer resistance, and a second condenser connecting the second end of said resistor to said slider contact.

4. An electrical unit as specified in claim 2, in which said slider contact is adjusted along said potentiometer resistance by the rebalancing motor of a self-balancing measuring mechanism, and in which said motor is subjected to damping actions by said electrical unit.

5. An electrical unit comprising in combination, a resistor, a source of variable unidirectional voltage and means cooperating therewith to maintain the two ends of said resistor at the same potential when said variable voltage is constant, and for increasing or decreasing the potential of one end of said resistor relative to the other end when said variable voltage is varying in one direction or in the opposite direction, respectively, a pair of electronic valves each having a control grid, a cathode, and an anode, one of said control grids being connected to one end and the other of said control grids being connected to the second end of said resistor, a transformer having primary and secondary windings and having said primary winding connected between the anodes of said valves, means including a source of unidirectional voltage connecting the midpoint of said transformer primary winding to said cathodes and arranged to keep the potentials of said anodes positive relative to the potentials of said cathodes, and means for connecting a source of unidirectional bias voltage and a source of alternating bias voltage in series between the midpoint of said resistor and said cathodes, said biasing voltages being proportioned and arranged for operation of said valves at a common point along a non-linear portion of the dynamic transfer characteristic curve of said valves when the ends of said resistor are at the same potential, and for operation of said valves at different points along the non-linear portion of said curve when the resistor end potentials are unequal, whereby a variation in the first mentioned voltage causes an alternating current signal to be induced in the secondary winding of said transformer which is of one phase or of the opposite phase accordingly as the variation in said first mentioned voltage is an increase or a decrease.

6. Mechanism comprising in combination, a first source of unidirectional voltage and means adjustable to vary said voltage, a resistor and a pair of condensers connected across said source with a respective one of said condensers connected between each end of said resistor and said source, a pair of electronic valves each having a control grid, a cathode, and an anode, one of said control grids being connected to one end and the other of said control grids being connected to the second end of said resistor, a transformer having primary and secondary windings, said primary winding being connected between said anodes, a second source of unidirectional voltage connected between the midpoint of said primary winding and said cathodes to maintain the potential of each anode positive relative to the potential of the associated cathode, a third source of unidirectional voltage, and conductor means for connecting said third unidirectional voltage source in series with a source of alternating current between the midpoint of said resistor and said cathodes, whereby the adjustment of the first mentioned means develops an alternating current signal in the secondary winding of said transformer which is of one phase or of the opposite phase accordingly as the change in the first unidirectional voltage is in one direction or in the opposite direction.

7. Mechanism comprising in combination, a resistor, energizing means connected to the ends of said resistor including an adjustable source of a first unidirectional voltage and means for adjusting said voltage to maintain the two ends of said resistor at the same potential when said voltage is constant and for increasing or decreasing the potential of one end of said resistor relative to the other end when said voltage is being varied in one direction or in the opposite direction, respectively, a pair of triodes each having a control grid, a cathode, and an anode, one of said control grids being connected to one end and the other of said control grids being connected to the second end of said resistor, a transformer having primary and secondary windings, said primary winding being connected between said anodes, means for connecting a source of a second unidirectional voltage between the midpoint of said primary winding and said cathodes to maintain the potential of each anode positive relative to the potential of the associated cathode, and means for biasing said triodes for operation at different points along a non-linear portion of their dynamic transfer characteristic curve when the potentials of the ends of said resistor vary, comprising a source of a third unidirectional voltage and conductor means for connecting said third unidirectional voltage source in series with a source of alternating current between the midpoint of said resistor and said cathodes, whereby the adjustment of the second mentioned means develops an alternating current signal in the secondary winding of said transformer which is of one phase or of the opposite phase accordingly as the change in said first unidirectional voltage is in one direction or in the opposite direction.

JAMES C. MOUZON.

No references cited.